July 7, 1959 C. A. MEYER 2,893,766
CLAMPING DEVICES
Filed Aug. 23, 1955 3 Sheets-Sheet 1

INVENTOR
CORNELIS A. MEYER
By Watson, Cole, Grindle & Watson
ATTORNEYS

July 7, 1959 C. A. MEYER 2,893,766
CLAMPING DEVICES
Filed Aug. 23, 1955 3 Sheets-Sheet 2

INVENTOR
CORNELIS A. MEYER
By Watson, Cole, Grindle & Watson
ATTORNEYS

July 7, 1959
C. A. MEYER
2,893,766
CLAMPING DEVICES
Filed Aug. 23, 1955
3 Sheets-Sheet 3
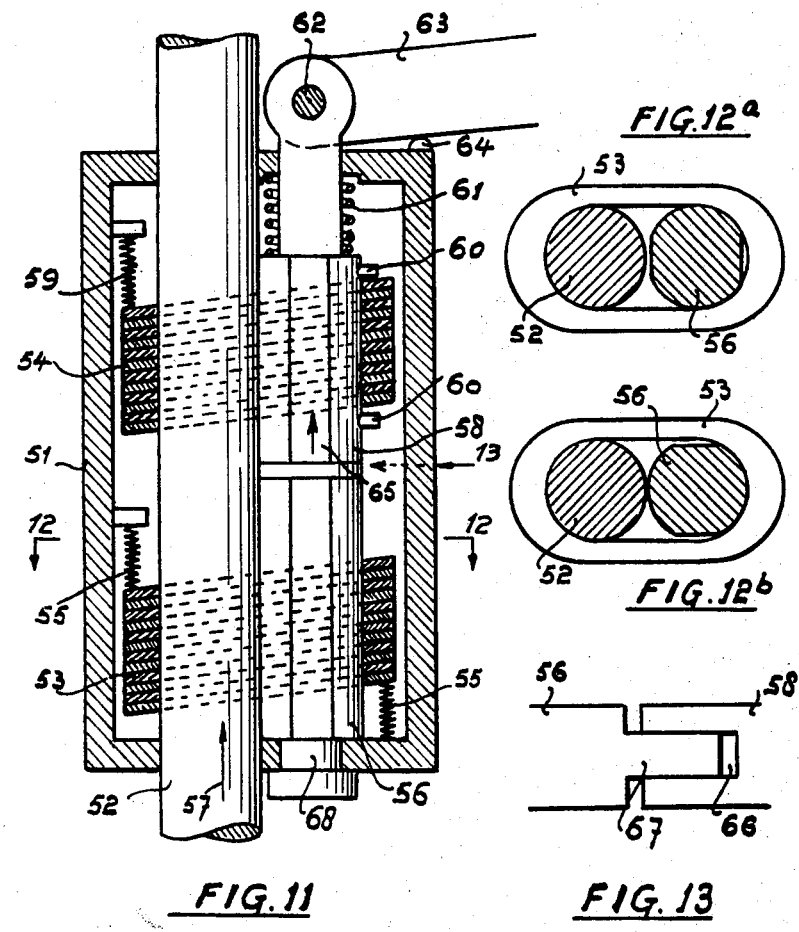
INVENTOR
CORNELIS A. MEYER
By Watson, Cole, Grindle & Watson
ATTORNEYS

United States Patent Office 2,893,766
Patented July 7, 1959

2,893,766

CLAMPING DEVICES

Cornelis A. Meyer, Bloemendaal, Netherlands

Application August 23, 1955, Serial No. 530,157

Claims priority, application Netherlands August 24, 1954

6 Claims. (Cl. 287—58)

The present invention relates to a device for clamping or locking together two rods, bars, shafts, tubes or like members to prevent longitudinal displacement in one direction at least of said members relative to each other.

An object of the invention is to provide a means for locking or clamping two rods or bar-like members together which comprises the minimum number of component parts and which therefore will be inexpensive to manufacture and highly trouble-free in use. Another object of the invention is to provide such a clamping or locking device which will be capable of carrying or transmitting relatively large loads but with which the clamping or locking may be established with the application of relatively small forces.

With these and other objects in view the device according to the invention comprises one or more tie elements disposed around the members to be clamped or locked together and arranged in an inclined position with respect to the axes of said members, and means resiliently to maintain said tie element or tie elements in the inclined position, one of said rod-like members being adapted to serve as a means for clamping said members together within said tie element or elements.

In a preferred embodiment of the invention one of the rod-like or similar members so differs in shape from the free passageway left by the other member in the tie element or elements that by rotating it about its longitudinal axis into one position it operates to clamp the other rod-like member and by rotating it into another position it releases said other member.

According to a further feature of invention means may be provided for limiting relative axial displacement of one of said rod-like members with respect to said tie-element or elements. In this manner it is made possible to effect the mutual clamping or locking in a very simple way, namely by inserting the second member adjacent to the first in the tie-element or elements and by turning or in any other way displacing the rod-like member which serves as the clamping member.

The device according to the invention in its simplest form comprises one tie element which can only prevent axial displacement of the rod-like members in relation to one another in one direction, to wit that in which the displacement would tend to decrease the angle between the element and the longitudinal axis of the rod-like member. In the other direction in which the displacement tends to place the tie-element more perpendicular to the longitudinal axis of the rod-like member a mutual displacement is possible. Apart from that, such a device has the disadvantage that the specific pressure between the element and the rod-like member may increase to undesirable values, particularly so if large forces are applied in the direction in which mutual displacement of the two rod-like members is prevented by the connection. Therefore, preferably a plurality of tie-elements is employed. In some cases it may be desired to enable movement in one direction even if the connection has been established whilst preventing movement in the opposite direction; in those cases all tie-elements are inclined in the same direction. In other cases, where a mutual displacement in two opposite directions is to be prevented, the tie-elements are arranged in such a way that one or more of them are inclined in one direction and one or more other elements are inclined in the opposite direction relative to the axes of the rod-like members.

In both these cases the tie elements may be constituted by the coils of a helically wound, preferably resilient, wire or rod. Normally, such a helix will prevent displacement in both directions, but by deforming the helix and by pressing it obliquely it is possible to attain that each of its convolutions is entirely inclined in one direction only or anyway has a portion which is merely perpendicular to the longitudinal axes of the rod-like members, so that locking is effected in one direction only.

The invention may be applied in several ways and for several purposes. For instance, as already stated, it may be used for clamping or locking together two rod-like or similarly shaped members but it may also serve to secure a rod-like member in a certain position, in some cases preventing displacement in both directions, such as in a casement adjuster, in other cases preventing movement in one direction only such as in the drawbar of a hand brake for a motor vehicle. In all these cases precautions should be taken that the second rod-like member to which it is to be clamped is fixed, for instance housed in a casing. Then there are three possibilities, namely one in which the fixed member also serves as the clamping member, one in which the displaceable member serves as the clamping member, for instance by having a noncircular cross-section, the fixed member being cylindrical, and one in which both the fixed and the displaceable member are adapted to serve as clamping members.

As will appear from the description of some embodiments of the invention the latter may also advantageously be employed in an automobile jack or similar lifting apparatus. In such applications the clamping member or another member coupled therewith is preferably adapted also to serve as a drive member or a tightening member for the jack spindle, thereby affording an extremely simple construction.

Other objects and further features of the invention will be apparent from the following description in detail of some embodiments of the invention illustrated, by way of example only, in the accompanying drawings.

Fig. 1 is a longitudinal elevation of one embodiment, while

Fig. 2 is a cross-sectional view taken along the line 2—2 in Fig. 1 of this embodiment.

Fig. 11 is a vertical cross-sectional view of a lifting jack in which the present invention has been employed, and Figs. 12a and 12b are cross-sectional views along the line 12—12 in Fig. 11, the clamping member being shown in two different positions, and Fig. 13 is a partial side elevation looking in the direction of the arrow 13 in Fig. 11.

Figures 1, 2:
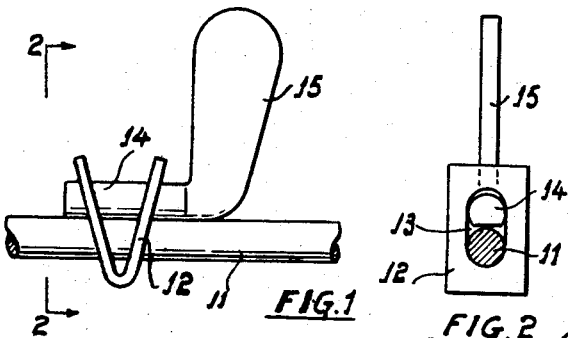

In the embodiment shown in Figures 1 and 2 a bar 11 to be clamped or locked in position is passed through an elongated aperture in each leg of a V-shaped strap or brace 12 forming a couple of tie elements, one leg simultaneously serving as the means resiliently to maintain the other leg in the inclined position, and vice versa. A clamping member 14 is inserted into the free portion of the apertures left by the bar 11, said clamping member being rotatable about its longitudinal axis by means of a transverse arm or wing 15. The clamping member 14 is of circular cross-section with a segment cut away to produce one flattened side. When the clamping member is in a position as shown in Fig. 2 in which it engages the bar 11 with its flattened side the bar 11 can be moved longitudinally in either direction through the apertures in the legs of the strap 12. If the clamping member 14 is rotated in one or other direction by an amount which causes its cylindrical portion to engage the bar 11, the elongated apertures in the legs of the strap being suitably dimensioned, the free space therein will be completely filled up, whereby the tie elements formed by the legs of the strap will be stressed and will prevent movement of the bar 11 in its longitudinal direction. The right hand leg (Fig. 1) of the V-shaped strap will prevent displacement of the bar 11 to the right, whereas the left hand leg will prevent displacement to the left.

The strap 12 or the clamping member 14 may be made immovable in any suitable manner, or may be attached to the structural part to which the bar 11 is to be clamped. With this object in view the strap 12 or the clamping member 14 may for instance be housed in a casing, as will hereinafter be described. However, the invention may also merely serve to connect two elongated members 12 and 14 to one another, one of those members also serving as a clamping member.

Figure 3:
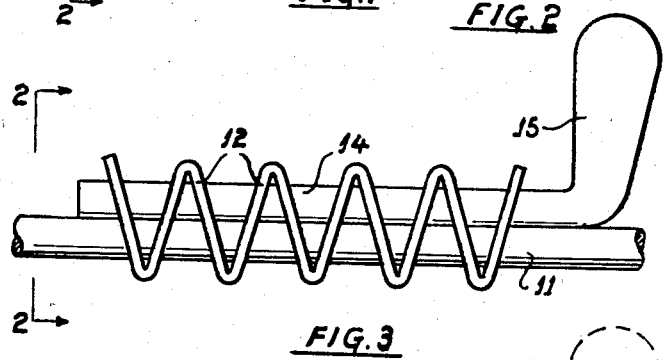
Fig. 3 is a longitudinal elevation of another embodiment, Fig. 2 also showing a cross-section along the line 2—2 of this embodiment.

The use of one strap, and particularly of one tie element (if the bar has to be secured against movement in one direction only) obviously has the disadvantage that there will be very high specific pressures between the bar, the clamping member and the tie element, so that there will be a risk of damaging the surface of the bar or of the clamping member or, in the case of a thin walled tube of causing said tube to collapse. To overcome this disadvantage an embodiment as shown in Fig. 3 may be used in which a plurality of tie elements 12 is constituted by the portions of a strip bent into zig-zag form.

Figure 4:
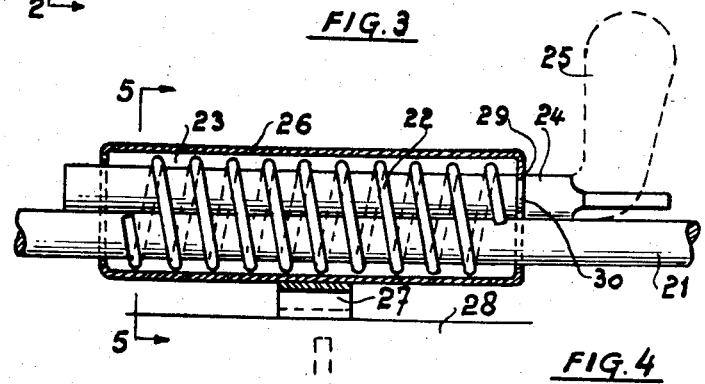
Fig. 4 is a longitudinal sectional view of another embodiment.
Figure 5:
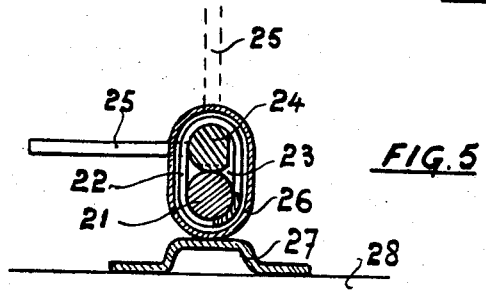
Fig. 5 is a cross section of this embodiment taken along the line 5—5 in Fig. 4.

Figures 4 and 5 show a particularly advantageous embodiment in which the tie elements are constituted by the coils of a helically wound, preferably resilient, wire or rod 22, said coils forming a channel or passageway 23 having an elongated cross-section, a bar 21 and a clamping member 24 passing through said channel or passageway.

The clamping member 24 again is provided with a wing 25 by means of which it may be rotated about its longitudinal axis, to wit either in the position represented by full lines in Fig. 5, in which the clamping member 24 engages the bar 21 with a portion of its cylindrical surface and stresses the coils of the helical spring 22, or into the position represented by dotted lines in which its flattened surface faces the bar and in which the latter is released.

The helix 22 is accommodated in a casing 26 having a base 27 by means of which it may be secured to a support 28.

The clamping member 24 is fixed in a longitudinal direction, in the illustrated embodiment by means of an inwardly projecting flange 29 of the casing 26 engaging a groove 30 in the clamping member.

As stated above the support 28 may be, for instance, the sill of a door case or a casement frame, and the bar 21 may be an adjuster pivotally connected to the door, or casement respectively. In such a case the bar 21 may also be bent, particularly along the arc of a circle the center of which is located in the pivotal axis of the door or window. In this event the bar need not be pivotally connected to the door or window, whereas also the stroke of the free extremity of the adjuster is somewhat restricted.

Figure 6:
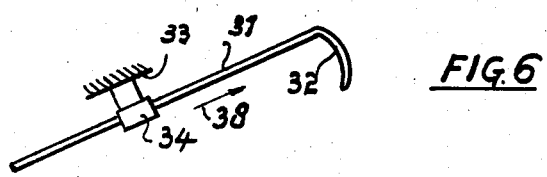
Fig. 6 is a general elevation of the actuating mechanism for a hand brake of a motor vehicle.
Figure 7:
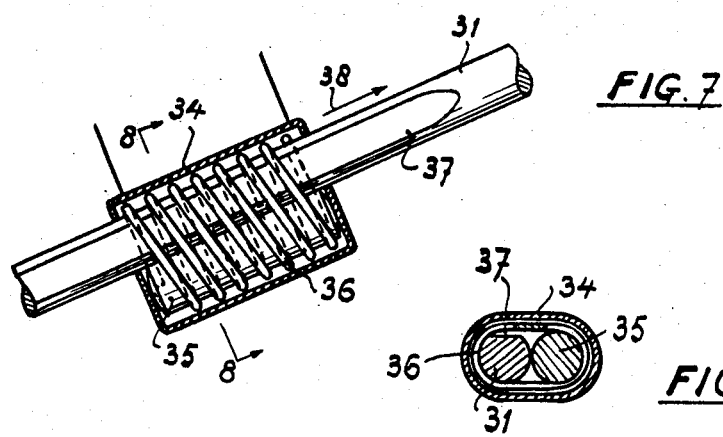
Fig. 7 is a longitudinal sectional view of the locking device thereof.
Figure 8:
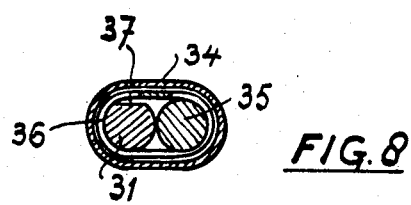
Fig. 8 is a cross-sectional view along the line 8—8 in Fig. 7.

Figures 6, 7 and 8 show the invention as applied to a locking device for a drawbar of a hand brake. The drawbar 31 is, in a conventional manner, provided with a hand grip 32 by means of which it may be pulled against the action of a spring or the like to apply the hand brake, and by means of which it may be turned in one direction to lock it in the position in which the brake is applied or turned in the opposite direction to enable releasing the brake.

The locking device comprises a casing 34 attached to some part 33 of the vehicle. A cylindrical bar 35 and a helically wound spring 36 constituting the tie elements and surrounding both said bar and the drawbar 31 are accommodated in the casing 34. The drawbar 31 also serves as a clamping member and to this end it is provided with a flattened side 37 so that in the position illustrated in Fig. 8 the spring 36 is stressed and the drawbar 31 is locked, whilst the drawbar may freely be reciprocated through the casing 34 when it is turned through an angle of approximately 90°.

In this particular embodiment the convolutions of the spring 36 have been pressed obliquely in such a way that each convolution in its entirety is inclined in the same direction with respect to the drawbar 31, or anyway that a portion of each convolution is merely perpendicular to the longitudinal axis of the drawbar. Thereby the drawbar may be pulled outwardly even if the brake has been locked by means of the drawbar having been turned, for, even if the spring 36 has been stressed it will not prevent the drawbar 31 from being displaced in the direction indicated by an arrow 38 in consequence of the particular position of the convolutions of the spring. Such a method of operation is not recommendable in the conventional constructions of locking devices having ratchet teeth since it may lead to undue wear of the ratchet teeth. Nevertheless, in practice this method is often used and there is no objection to it when the locking device has been constructed according to the invention as shown and described, since hardly any wear will be caused thereby, and moreover, wear and tear has little influence on the reliability of the locking device.

Figure 9:
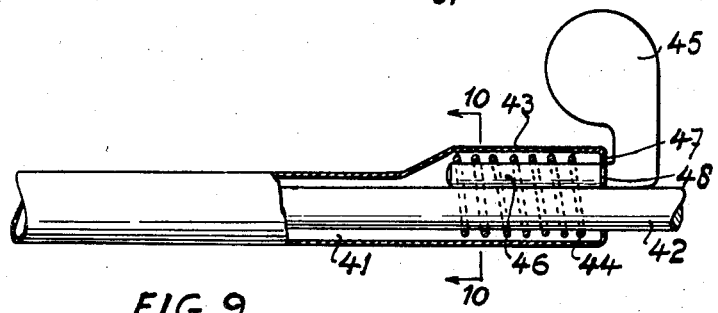
Figs. 9 and 10 are a longitudinal and a cross-sectional view (on an enlarged scale) respectively of a telescopic tube having a locking device in accordance with the invention.
Figure 10:
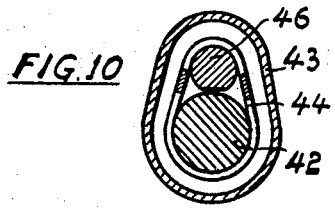

The embodiment shown in Figures 9 and 10 comprises the application of the invention for locking two telescoping tubes, or a telescoping bar and tube. A tube or bar 42 is slidably mounted in a tube 41. In order to enable locking the two parts in various positions in relation to one another the extremity of the tube 41 is widened to form a casing 43, in which a helically wound spring 44 constituting the tie elements and a clamping member 46 provided with an operating arm 45 is accommodated. The clamping member is held in place by an inwardly bent edge 47 of the casing 43 engaging a groove 48 of the clamping member 46. The latter again is of circular cross-section with a cutaway portion so that it may be turned in a position in which the spring is stressed in such a way that the bar 42 is locked with respect to the tube 41, and in a position as shown in Fig. 10 in which the spring is eased so that the bar 42 is freely slidable in the tube 41.

The jack represented in Figures 11–13 comprises a casing 51, which may be carried by a support (not shown). The jack spindle 52 passes through this casing and it is surrounded by two sets of rings 53 and 54 respectively constituting the tie elements. The first-mentioned set of rings is resiliently held in an inclined position by means of compression springs 55. A noncircular clamping member 56 is passed through the rings 53 adjacent to the jack spindle 52. This clamping member may be turned in a position as shown in Fig. 12a in which the spindle 52 is freely slidable in both axial directions, and in a position as shown in Fig. 12b in which the rings 53 are stressed about the spindle 52 or may even have been displaced against the action of the springs 55 in a slightly less inclined position. The spindle may now be moved axially in the direction of an arrow 57, but not in the opposite direction.

For effecting a displacement in an axial direction and therefore a lifting action such as jacking a motorcar a drive member 58 has been inserted into the free space left by the spindle 52 in the upper set of rings 54, said drive member also being constructed as a clamping member. The rings 54 are resiliently held in the inclined position by a compression spring 59 co-operating with two studs 60 on the drive member 58. The drive member 58 is reciprocably mounted in the casing 51 and it is forced in the position illustrated in Fig. 11 by a compression spring 61, whilst it may be displaced against the action of this spring in the direction indicated by an arrow 65 by means of a lever 63 pivotally connected thereto at 62 and co-operating with a cam 64. A displacement in this direction in relation to the spindle 52 is prevented, however, by the rings 54, so that the spindle 52 is carried or driven by the drive member 58 in the direction of the arrow 57. In the return stroke of the drive member 58 the latter is able to move with respect to the spindle 52 which is prevented from moving down together with the drive member by the rings 53. Hence, in this way the spindle 52 may be moved step by step in the direction of the arrow 57.

In order to lower the load the clamping member 56 and the drive member 58 having a correspondingly shaped cross-section must be turned in the position as shown in Fig. 12a by means of the lever 63. With this object in view the drive member 58 has a groove 66 in its extremity facing the clamping member 56, whereas the latter has a tongue 67 co-operating with said groove to form a claw coupling. As in the embodiments described so far the clamping member 56, in contradistinction to the drive member 58 must be locked in an axial direction in the casing 51; therefore it has a groove 68, for instance formed by a tap bolt screwed into its extremity, engaged by the wall of the housing 51.

As already stated the locking or connecting device according to the invention may be employed in a great number and variety of cases, and the embodiments shown have been given by way of example only. For instance, the clamp device may serve as a casement- or door-adjuster or fastener, but it may also serve as a stand for a camera, a pedestal lamp, laboratory or other instruments, or a garden sun umbrella, etc. It may also be used to secure any structural part in or to another, particularly so if the joint is to be easily releasable or adjustable. Furthermore, the device may serve to couple two bars or tubes, a portion and preferably the extremity of one of these bars or tubes constituting the clamping member.

Apart from the advantages set forth above the device according to the invention affords the particularly important advantage that the force required to effect the clamping action is extremely small, inasmuch as it is necessary only to cause the clamping member more or less tightly to engage the coils of the helical spring, or the edges of the apertures in the rings, the strap or the zig-zag strip respectively, or perhaps to set these coils, or rings or legs of the strap or zig-zag strip respectively, in a slightly less inclined position with respect to the longitudinal axis. Thereby the device according to the invention is particularly adapted not only to be located in less accessible places in which, generally speaking, only small forces can be applied, but also to be used in remote control systems, either electrically, pneumatically or hydraulically operated.

Moreover, the device according to the invention has the advantage that it may be lubricated or greased without impairing the tightness of the clamp. Furthermore, the bar to be clamped can be accommodated with ample clearance in the tie elements thereby considerably facilitating the assembly. But also in the position in which the tie elements are stressed, the bar thus clamped still has a considerable freedom of movement in a plane perpendicular to that in which the larger transverse dimension of the elongated aperture in the tie elements is located. Thereby the device according to the invention is also highly insensible to inaccuracies in assembly.

Various additions or modifications may be made without departing from the scope of the invention. For instance, the tie members may be accommodated, either separately or not, in the wall of a casing made of rubber or some similar resilient material. The coils of the helical spring might also have an elongated or flat cross-section having its longer dimension disposed parallel to the axis of the helix, so as still more to decrease the specific pressure and thereby to reduce the risk of damage to the article to be clamped.

Then, the clamping member might be made of a resiliently deformable material such as nylon, in which case the tie elements penetrate to some extent into one side of the clamping member, whilst true, the bar is clamped and secured but still may be slightly reciprocated longitudinally as a consequence of the resilient deformability of the clamping member.

Having thus described and ascertained my said invention, I declare that what is claimed as new and desired to be secured by Letters Patent is:

1. A device for clamping two rod-like members together, comprising a helically wound wire surrounding at least a portion of each of said members, and a casing accommodating said wire and at least a portion of one of said members, the latter-mentioned member being longitudinally fixed relative to said casing and being adapted to stress said wire about said members and to release said wire.

2. A device for clamping two rod-like members together, comprising at least one tie element surrounding said members and being resiliently held in an inclined position in relation to the axes of said members, one of said members being of a noncircular cross section and rotatably mounted but longitudinally fixed with respect to said tie element.

3. A device for clamping two rod-like members together, comprising a helically wound spring surrounding at least a portion of each of said members, one of said members being rotatable and the portion thereof surrounded by said spring being of a noncircular cross section.

4. A device for clamping two rod-like members together, comprising a helically wound spring surrounding at least a portion of each of said members, and means for limiting the relative axial displacement of said spring and one of said members, one of said members being rotatable and of a noncircular cross section.

5. A device for clamping two rod-like members together, comprising a casing and a helically wound spring accommodated in said casing and surrounding at least a portion of each of said members, one of said members being rotatable but longitudinally fixed with respect to said casing and being of a noncircular cross section.

6. A locking device comprising a stationary casing, at least one tie element in said casing resiliently held in an inclined position with respect to the longitudinal axis of said casing, a rod-like member accommodated in said tie element and longitudinally fixed with respect to said casing, a rod-like member slidably mounted and passed through the free space left in said tie element by said first-named member, said first-mentioned rod-like member being of a noncircular cross section and being rotatable about its longitudinal axis.

References Cited in the file of this patent

UNITED STATES PATENTS

| | | |
|---|---|---|
| 958,440 | Sackman | May 17, 1910 |
| 1,511,677 | Page | Oct. 14, 1924 |
| 1,924,858 | Hopp | Aug. 29, 1933 |

FOREIGN PATENTS

| | | |
|---|---|---|
| 109,796 | Australia | Feb. 22, 1940 |
| 168,411 | Great Britain | Sept. 1, 1921 |
| 482,779 | Great Britain | Apr. 5, 1938 |